(12) United States Patent
Cinier et al.

(10) Patent No.: US 9,234,666 B2
(45) Date of Patent: Jan. 12, 2016

(54) HEAT TRANSFER APPARATUS FOR HEATING AND COOLING A ROOM

(76) Inventors: Michel Cinier, Sete (FR); Stéphane Cinier, Sete (FR)

(*) Notice: Subject to any disclaimer, the term of this patent is extended or adjusted under 35 U.S.C. 154(b) by 753 days.

(21) Appl. No.: 13/262,645

(22) PCT Filed: Apr. 21, 2010

(86) PCT No.: PCT/FR2010/000321
§ 371 (c)(1),
(2), (4) Date: Dec. 26, 2011

(87) PCT Pub. No.: WO2010/149865
PCT Pub. Date: Dec. 29, 2010

(65) Prior Publication Data
US 2012/0134653 A1 May 31, 2012

(30) Foreign Application Priority Data
Jun. 23, 2009 (FR) ...................................... 09 03044

(51) Int. Cl.
| | |
|---|---|
| F24D 5/10 | (2006.01) |
| F24D 19/02 | (2006.01) |
| F24H 9/06 | (2006.01) |
| F24F 5/00 | (2006.01) |
| F24D 5/04 | (2006.01) |
| F24D 19/00 | (2006.01) |
| F24F 1/00 | (2011.01) |
| F24H 3/04 | (2006.01) |

(52) U.S. Cl.
CPC ............... *F24F 5/0089* (2013.01); *F24D 5/04* (2013.01); *F24D 19/0087* (2013.01); *F24F 1/0007* (2013.01); *F24F 1/0014* (2013.01); *F24F 1/0022* (2013.01); *F24F 1/0033* (2013.01);*F24H 3/0411* (2013.01); *F24F 2221/17* (2013.01); *F24F 2221/54* (2013.01)

(58) Field of Classification Search
CPC ...... F24F 1/0014; F24F 1/0011; F24F 1/0029; F24F 1/0033; F24F 2001/0037
USPC .................................. 165/201, 53, 54, 55, 69
See application file for complete search history.

(56) References Cited

U.S. PATENT DOCUMENTS 2,019,583 A * 11/1935 Redfield ........................ 165/108
2,044,832 A * 6/1936 Child ............................... 62/289
(Continued)

FOREIGN PATENT DOCUMENTS

| DE | 103 29 611 A1 | 1/2005 |
|---|---|---|
| EP | 1 361 398 A | 11/2003 |

(Continued)

OTHER PUBLICATIONS

International Search Report, Aug. 25, 2010, from International Phase of the instant application.

*Primary Examiner* — Ljiljana Ciric
(74) *Attorney, Agent, or Firm* — Jackson Patent Law Office

(57) ABSTRACT

A heat transfer apparatus for heating and cooling a room includes a heat exchanger including a body with tubing and fins traversed by a heat transfer fluid, the heat exchanger including a first module and a second module. A plurality of helical fans downstream from the heat exchanger have axes of rotation passing between the first and second modules. A plate for storing heat is downstream from the plurality of helical fans is present. Each of the axes of rotation pass through the plate, and the plate and frame together define an air outlet configured to expel air from the apparatus in a direction parallel to the rotation axes, and define an air passage parallel to the plate from the helical fans to the air outlet, and wherein the apparatus defines an air inlet configured to draw air in a direction traverse to the rotation axes.

16 Claims, 2 Drawing Sheets

(56) References Cited

U.S. PATENT DOCUMENTS

| | | | | |
|---|---|---|---|---|
| 2,070,690 A * | 2/1937 | Smith | | 165/122 |
| 2,159,913 A * | 5/1939 | Tenney | | F28D 1/024 165/125 |
| 2,252,064 A * | 8/1941 | Cornell, Jr. | | 165/125 |
| 2,278,376 A * | 3/1942 | Young | | F28D 1/024 165/69 |
| 2,363,839 A * | 11/1944 | Demuth | | 165/57 |
| 2,377,094 A * | 5/1945 | Meyerhoefer | | 165/127 |
| 2,560,372 A * | 7/1951 | Sanchis | | 165/122 |
| 2,638,757 A * | 5/1953 | Borgerd | | 165/57 |
| 2,773,364 A * | 12/1956 | Zipser | | 165/53 |
| 3,097,287 A * | 7/1963 | Knoll | | F24H 3/0411 165/124 |
| 3,247,895 A * | 4/1966 | Phillips, Jr. | | F24D 5/02 165/50 |
| 3,292,688 A * | 12/1966 | Shrader | | 165/122 |
| 3,369,541 A * | 2/1968 | Thomason | | F24F 5/0046 165/10 |
| 3,775,972 A * | 12/1973 | Perpall | | 165/69 |
| 3,858,291 A * | 1/1975 | Perpall | | 165/69 |
| 3,988,900 A * | 11/1976 | Kamata et al. | | 62/92 |
| 4,252,181 A * | 2/1981 | Kirchmeier | | 165/10 |
| 4,318,693 A * | 3/1982 | Gutzwiller | | 432/201 |
| 4,458,502 A * | 7/1984 | Adachi et al. | | 62/259.1 |
| 4,522,255 A * | 6/1985 | Baker | | 165/122 |
| 4,541,479 A * | 9/1985 | Bergeron, Jr. | | 165/57 |
| 4,549,602 A * | 10/1985 | Espinoza | | 165/67 |
| 4,602,676 A * | 7/1986 | Bergeron, Jr. | | 165/48.2 |
| 4,651,805 A * | 3/1987 | Bergeron, Jr. | | 165/48.1 |
| 4,660,389 A * | 4/1987 | Kido et al. | | 62/298 |
| 4,702,085 A * | 10/1987 | Nakajima et al. | | 62/265 |
| 4,718,249 A * | 1/1988 | Hanson | | 165/48.1 |
| 4,817,708 A * | 4/1989 | Ono | | F24F 7/013 165/54 |
| 5,113,667 A * | 5/1992 | Sullivan | | 62/291 |
| 5,135,046 A * | 8/1992 | Becquerel et al. | | 165/122 |
| 5,148,683 A * | 9/1992 | Muller et al. | | 62/180 |
| 5,180,279 A * | 1/1993 | McLane-Goetz et al. | | 165/135 |
| 5,230,719 A * | 7/1993 | Berner et al. | | 165/97 |
| 5,232,403 A * | 8/1993 | Marotta | | 454/289 |
| 5,280,749 A * | 1/1994 | Smit | | 219/400 |
| 5,538,074 A * | 7/1996 | Meyer | | 165/96 |
| 5,577,958 A * | 11/1996 | Kumekawa et al. | | 454/233 |
| 5,595,068 A * | 1/1997 | Amr | | 454/296 |
| 5,669,229 A * | 9/1997 | Ohbayashi et al. | | 62/259.1 |
| 5,696,872 A * | 12/1997 | Seward | | 219/400 |
| 5,697,841 A * | 12/1997 | Di Giovine | | 454/290 |
| 5,700,420 A * | 12/1997 | Nakagawa et al. | | 266/44 |
| 5,768,908 A * | 6/1998 | Tanaka et al. | | 62/332 |
| 5,988,264 A * | 11/1999 | Goldsmith | | 165/53 |
| 6,038,786 A * | 3/2000 | Aisenberg et al. | | 34/267 |
| 6,201,313 B1 * | 3/2001 | Nakamats | | 290/54 |
| 6,225,705 B1 * | 5/2001 | Nakamats | | 290/43 |
| 6,260,373 B1 * | 7/2001 | Rockwood | | 165/69 |
| 6,286,500 B1 * | 9/2001 | Jones | | 126/91 A |
| 6,370,907 B1 * | 4/2002 | Sekiguchi et al. | | 454/233 |
| 6,450,880 B1 * | 9/2002 | Asahina et al. | | 454/233 |
| 6,454,530 B1 * | 9/2002 | Lange | | 415/177 |
| 6,470,699 B1 * | 10/2002 | Okuda et al. | | 62/259.2 |
| 6,481,237 B2 * | 11/2002 | Kim | | 62/407 |
| 6,551,185 B1 * | 4/2003 | Miyake et al. | | 454/234 |
| 6,564,858 B1 * | 5/2003 | Stahl et al. | | 165/122 |
| 6,575,436 B2 * | 6/2003 | Litz | | 261/27 |
| 6,587,642 B1 * | 7/2003 | King | | 392/364 |
| 6,598,413 B2 * | 7/2003 | Asahina et al. | | 62/298 |
| 6,662,590 B2 * | 12/2003 | Kamuf | | 165/54 |
| 6,802,361 B2 * | 10/2004 | Hatanaka | | 165/53 |
| 6,827,081 B2 * | 12/2004 | Hay | | 165/48.2 |
| 6,868,693 B2 * | 3/2005 | Choi et al. | | 62/411 |
| 6,874,334 B2 * | 4/2005 | Kim et al. | | 62/412 |
| 6,951,099 B2 * | 10/2005 | Dickau | | 60/300 |
| 6,959,520 B2 * | 11/2005 | Hartman | | 52/838 |
| 6,978,826 B2 * | 12/2005 | Matsubara | | 165/59 |
| 7,121,110 B2 * | 10/2006 | Yum et al. | | 62/411 |
| 7,143,762 B2 * | 12/2006 | Harrison et al. | | 126/589 |
| 7,177,156 B2 * | 2/2007 | Yatskov et al. | | 361/709 |
| 7,185,504 B2 * | 3/2007 | Kasai et al. | | 62/186 |
| 7,185,510 B2 * | 3/2007 | Lee et al. | | 62/419 |
| 7,191,615 B2 * | 3/2007 | Lee et al. | | 62/411 |
| 7,204,096 B2 * | 4/2007 | Iwata et al. | | 62/426 |
| 7,409,986 B2 * | 8/2008 | Lee et al. | | 165/267 |
| 7,497,246 B2 * | 3/2009 | Sakashita et al. | | 165/53 |
| 7,614,246 B2 * | 11/2009 | Yabu et al. | | 62/259.1 |
| 7,614,250 B2 * | 11/2009 | Sanagi | | 62/426 |
| 7,631,641 B1 * | 12/2009 | Goldman et al. | | 126/629 |
| 7,757,749 B2 * | 7/2010 | Sakashita et al. | | 165/53 |
| 7,805,957 B2 * | 10/2010 | Liu | | 62/419 |
| 7,823,582 B2 * | 11/2010 | Harrison et al. | | 126/589 |
| 7,934,543 B2 * | 5/2011 | Fieback et al. | | 165/47 |
| 8,006,512 B2 * | 8/2011 | Sanagi et al. | | 62/426 |
| 8,016,652 B2 * | 9/2011 | Tanaka et al. | | 454/284 |
| 8,057,565 B2 * | 11/2011 | Yabu et al. | | 55/378 |
| 8,146,707 B2 * | 4/2012 | Choi et al. | | 181/225 |
| 8,230,957 B2 * | 7/2012 | Braun et al. | | 180/68.1 |
| 8,285,127 B2 * | 10/2012 | Mulder | | 392/347 |
| 8,311,439 B2 * | 11/2012 | Bennett et al. | | 165/69 |
| 8,343,244 B2 * | 1/2013 | Sakashita | | 55/283 |
| 8,387,404 B2 * | 3/2013 | Choi et al. | | 62/132 |
| 8,443,622 B2 * | 5/2013 | Kim et al. | | 62/426 |
| 8,511,108 B2 * | 8/2013 | Yabu et al. | | 165/53 |
| 8,554,098 B2 * | 10/2013 | Nishiyama | | 399/69 |
| 8,562,398 B2 * | 10/2013 | Tanaka et al. | | 454/284 |
| 8,625,976 B2 * | 1/2014 | Mulder | | 392/347 |
| 8,715,047 B2 * | 5/2014 | Kim | | 454/254 |
| 8,734,553 B2 * | 5/2014 | Sakashita et al. | | 55/289 |
| 8,787,738 B2 * | 7/2014 | Mulder | | 392/347 |
| 8,790,540 B2 * | 7/2014 | Holloway et al. | | 252/70 |
| 8,876,581 B2 * | 11/2014 | Ulmanen | | F24F 1/0007 454/261 |
| 8,973,390 B2 * | 3/2015 | Shirota | | F24F 1/0029 62/288 |
| 9,091,456 B2 * | 7/2015 | Sakashita | | F24F 13/28 454/233 |
| 2001/0054493 A1 * | 12/2001 | Hatanaka | | 165/53 |
| 2002/0145209 A1 * | 10/2002 | Litz | | 261/26 |
| 2002/0177400 A1 * | 11/2002 | Asahina et al. | | 454/233 |
| 2004/0050077 A1 * | 3/2004 | Kasai et al. | | 62/186 |
| 2004/0079094 A1 * | 4/2004 | Kasai et al. | | 62/186 |
| 2004/0093886 A1 * | 5/2004 | Takeuchi et al. | | 62/259.1 |
| 2004/0237571 A1 * | 12/2004 | Choi et al. | | 62/411 |
| 2004/0237572 A1 * | 12/2004 | Lee et al. | | 62/419 |
| 2004/0244401 A1 * | 12/2004 | Lee et al. | | 62/411 |
| 2004/0244403 A1 * | 12/2004 | Kim et al. | | 62/419 |
| 2005/0051321 A1 * | 3/2005 | Lee et al. | | 165/234 |
| 2005/0097915 A1 * | 5/2005 | Joo et al. | | 62/408 |
| 2006/0000585 A1 * | 1/2006 | Bianchi et al. | | 165/122 |
| 2006/0010901 A1 * | 1/2006 | Iwata et al. | | 62/426 |
| 2006/0213216 A1 * | 9/2006 | Sakashita et al. | | 62/419 |
| 2006/0276123 A1 * | 12/2006 | Sanagi et al. | | 454/292 |
| 2007/0116559 A1 * | 5/2007 | Higashida | | 415/206 |
| 2008/0142197 A1 * | 6/2008 | Van Andel et al. | | 165/104.26 |
| 2008/0200112 A1 * | 8/2008 | Ulmanen et al. | | 454/261 |
| 2008/0223062 A1 * | 9/2008 | Yabu et al. | | 62/259.1 |
| 2008/0236785 A1 * | 10/2008 | Nikula et al. | | 165/48.1 |
| 2008/0254734 A1 * | 10/2008 | Uenaka et al. | | 454/256 |
| 2009/0013711 A1 * | 1/2009 | Sakashita et al. | | 62/291 |
| 2009/0056929 A1 * | 3/2009 | Mulder | | 165/247 |
| 2009/0113915 A1 * | 5/2009 | Kim et al. | | 62/259.1 |
| 2009/0266524 A1 * | 10/2009 | Zheng et al. | | 165/122 |
| 2009/0288800 A1 * | 11/2009 | Kang et al. | | 165/59 |
| 2010/0101110 A1 * | 4/2010 | Lee | | 34/488 |
| 2014/0374063 A1 * | 12/2014 | Paavilainen | | F24F 1/0007 165/96 |

FOREIGN PATENT DOCUMENTS

| | | |
|---|---|---|
| EP | 1 772 678 A | 4/2007 |
| EP | 1 878 978 A | 1/2008 |
| GB | 2 378 502 A | 2/2003 |
| JP | 11 148 711 A | 6/1999 |
| WO | WO 2007/060922 A | 5/2007 |

* cited by examiner

HEAT TRANSFER APPARATUS FOR HEATING AND COOLING A ROOM

CROSS-REFERENCE TO RELATED APPLICATIONS

This application is U.S. National Stage Entry of International Application PCT/FR2010/000321, which claims priority benefits of French Application 09/03044 filed 23 Jun. 2009.

BACKGROUND OF THE INVENTION

1. Field of the Invention

The present invention relates to the field of reversible radiators of the type comprising:
- an exchanger of the type constituted by a body with fins and a tubing traversed by a heating or cooling heat transfer fluid;
- a means of ventilation designed to draw the ambient air, to force its passage through the exchanger and to eject it, heated or cooled, into the room;
- a frame, containing the aforementioned exchanger and the aforementioned means of ventilation, provided with at least one air inlet opening and at least one air outlet opening;
- a plate, for storing and distributing calories or frigories, attached to the front wall of the aforementioned frame.

2. Description of Related Art

Radiators known of the type in question generally have a single exchanger module, one or two fans powered by alternating current and an air outlet which is generally located at the top, bottom and/or sides.

Such devices have disadvantages tied to the fact that:
- the fans are large and affect the thickness of the radiators, they are noisy and consume energy;
- the thermal efficiency between the drawn air and the exchanger is not optimized;
- the lateral air outlet is less efficient than a front air outlet.

Among the documents of the closest prior art, can be cited:
- the document EP1878978 which describes a reversible air conditioner, attached to the ceiling, comprising a temperature adjustment unit containing an exchanger and a ventilation means, a distribution chamber placed at the outlet of the aforementioned unit and a plate, radiant and air permeable, completely closing the aforementioned chamber, realized in a fibrous material;
- the document JP11148711 describes an air conditioner comprising two fans arranged side by side, two exchanger modules positioned on each side of the row of fans and two openings positioned on each side of the latter.

SUMMARY OF THE INVENTION

The invention aims to implement a radiator of the type in question having new and original features and whose main purpose is to reduce or eliminate the aforementioned drawbacks, namely:
- reducing the thickness, the noise level and energy consumption;
- improving thermal efficiency by optimizing the flow of the intake air and the thermal exchange.

To this end, the radiator according to the invention is essentially characterized in that:
- the means of ventilation is constituted by a plurality of helical fans supplied with low voltage direct current, positioned, side by side, along the axis of symmetry of the front wall of the frame, facing and perpendicular to the longitudinal outlet opening of the aforementioned front wall: such as configuration enables a better distribution of the intake air, has a better audio performance, reduces the thickness of the radiators and enables an energy savings because they are supplied with direct current low voltage 12-24 or 48 volts, that halves the consumption of alternating current fans;
- the exchanger is made of at least two modules positioned on each side of the row of fans, parallel to the latter, and the air inlet opening is constituted by longitudinal openings positioned on each external side of each exchanger module, parallel to the latter: in such a configuration, all the drawn air passes through the entire exchange surface and especially because the walls of the radiator are closer than those of a standard radiator; in addition, the use of water as heat transfer fluid constitutes an advantage in relation to the aspect of respect for the environment, reducing the amount of refrigerant fluid in heat pump installations and the risk of leakage of these; nevertheless, the exchanger of the radiator according to the invention could also use this type of fluid;
- the plate, for storing and distributing calories or frigories, is positioned at a distance from the front wall of the frame and is dimensioned to enable the passage of the drawn heated or cooled air and its distribution in the room between the periphery of the frame and the periphery of the aforementioned plate, perpendicular to the latter; such a configuration enables a better distribution of air into the room and the thermal inertia plate enables a better control of the calories transmitted by radiation; in addition, this airflow with natural vertical convection and non conventional convection enables providing an identical temperature at the floor as at the ceiling for better comfort and a substantial gain in energy savings.

According to particular implementation modes of the invention:
- the plate, for storing and distributing calories or frigories, is made of a material selected from among cast mineral, metal, or glass;
- the fans are attached to the frame by means of elastic rubber blocks of the "SILENTBLOC®" type and traverse a silicone sheet that covers the outlet opening;
- the tubing having two vertical modules is doubled so as to produce the effect of one tubing having a heat transfer fluid conveying calories and the other tubing having a heat transfer fluid conveying frigories, the free ends of the tubings being connected to a four-way double valve.
- the air inlet openings, which are equipped with filters, are made on a wall of the frame which is located at a distance from the bottom of the radiator, thus from the wall on which it is posed, enabling the passage of an suction head, having appropriate shape, directly connectable to a home vacuum cleaner, avoiding the removal of filters and enabling easy performance of a recurring maintenance.

The frames of the radiators can be square or rectangular and in the latter case they can be positioned vertically or horizontally.

Other advantages resulting from the aforementioned features:
- reduced weight of the assembly;
- ease of installation;
- adaptation to all generators (high temperature, low temperature, very low temperature, ice water).

The objectives have been achieved through specific selection, dimensioning and layout of various constituent subassemblies that seem not to be taught in the cited prior art.

In fact:
- the path of the air between the inlets located at the back (opposing the support wall) and the front outlet is completely new and optimized to best exploit the available volume and the heat exchanges with the minimum of turbulence;

the positioning of the air inlets and outlets, the exchangers and the fans, coupled to the plate for storing, contribute to achievement of the desired result.

The means of ventilation has the advantages of having a very low energy consumption compared to traditional systems that are all equipped with forward or backward centrifugal fans, or cross-flow fans; a very small thickness enabling the reversible radiator to have a thickness of less than 120 mm, a lowest sound level (inaudible at low speed).

The storage plate enables a substantial linear air distribution, because over the entire periphery of the aforementioned plate exerting a horizontal airflow at very low speed, providing comfort with the absence of air current (lower output to 0.5 m/s).

This plate has the following features: hiding the plurality of fans; absorbing the sound emission caused by the air flow of the aforementioned fans; absorbing a part of the calories or frigories in order to return it by radiation; distributing the air flow linearly and uniformly around the periphery of the plate, while reducing the output speed of air, significantly reducing the effect of airflow, and the sound level induced by the passage of air; providing support for the decoration of the radiator (it is easily interchangeable).

Comfort is enhanced by the radiation from the facade enabling a complementary static distribution, in the air filtration device; it is accessible for easy cleaning, without removing the filters, using a special tip adaptable to all household vacuum cleaners. The main cause of non-compliance with primary maintenance of air conditioning units is brought about by the need to dismantle filtration systems for their cleaning.

The storage façade is interchangeable in order to change the design (decor) of the radiator without having to replace the entire structure.

The heater can be constituted by two separable parts of equal weight, enabling easy installation (even by a single person).

The joining of the two parts may be provided by two lever clasps (thus facilitating the disassembly).

BRIEF DESCRIPTION OF THE DRAWING

The features and the advantages of the invention are going to appear more clearly upon reading the detailed description that follows of at least one preferred implementation mode thereof given by way of non-limiting example and shown in the accompanying drawings.

In the drawings.

DETAILED DESCRIPTION OF THE INVENTION

Figure 1:
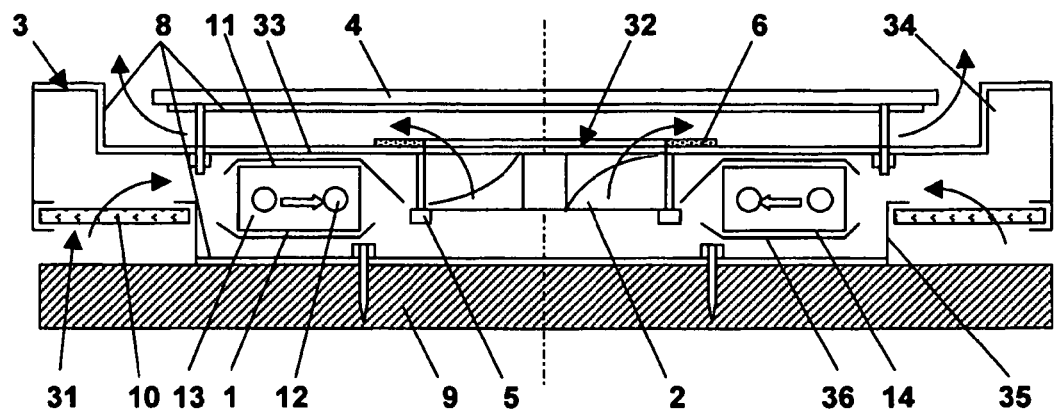
FIG. 1 is a cross-sectional view of the radiator according to the invention.
Figures 2, 3, 4:
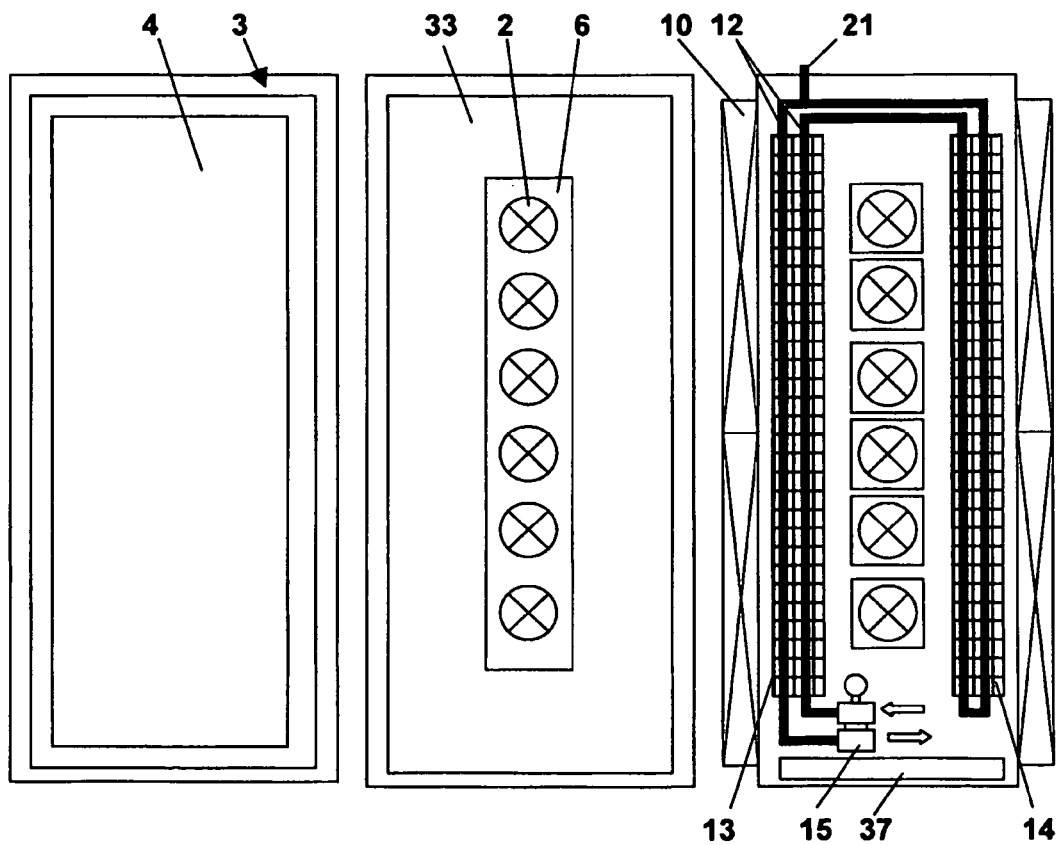
FIG. 2 is a plan view of the complete radiator.
FIG. 3 is a plan view of the radiator without the front plate.
FIG. 4 is a plan view of the radiator without the upper frame.
Figure 5:
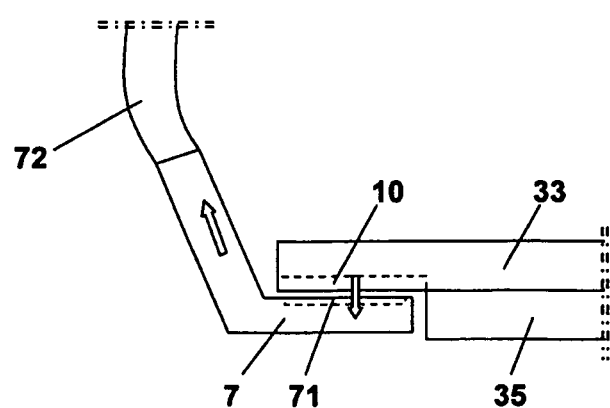
FIG. 5 is a side view of the suction head according to the invention acting on the filter.

The reversible radiator shown is of the type comprising:
an exchanger (1) of the type constituted by a body with fins (11) and a tubing (12) traversed by a heating or cooling heat transfer fluid;
a means of ventilation (2) designed to draw the ambient air, to force its passage through the exchanger (1) and to eject it, heated or cooled, into the room;
a frame (3), containing the aforementioned exchanger (1) and the aforementioned means of ventilation (2), provided with at least one air inlet opening (31) and at least one air outlet opening (32);
a plate (4), for storing and distributing calories or frigories, attached to the front wall (33) of the aforementioned frame (3).

The originality of the invention comprises the combination of the following subassemblies:
the means of generation which is constituted by a plurality of helical fans (2) supplied with low voltage direct current, positioned, side by side, along the axis of symmetry of the front wall (33) of the frame (3), facing and perpendicular to the longitudinal outlet opening (32) of the aforementioned front wall (33);
the exchanger (1) which is made of at least two modules (13) and (14) positioned on each side of the row of fans (2), parallel to the latter;
the air inlet opening (31) which is constituted by longitudinal openings positioned on each external side of each exchanger module (13,14), parallel to the latter,
the plate (4), for storing and distributing calories or frigories, which is positioned at a distance from the front wall (33) of the frame (3) and is dimensioned to enable the passage of the drawn heated or cooled air and its distribution in the room between the periphery (34) of the frame (3) and the periphery of the plate (4), perpendicular to the latter.

The back part (35) of the frame (3) is leaned against the wall (9) in order to be attached to it.

Other features of the invention relate to:
the plate (4), for storing and distributing calories or frigories, which is made of a material selected from among cast mineral, metal, or glass;
the fans (2) which are attached to the frame (3) by means of elastic rubber blocks (5) of the "SILENTBLOC®" type and that traverse a silicone sheet (6) that covers the outlet opening (32);

The tubings (12), being part of two exchanger modules (13) and (14), are connected between themselves at one end.

The free ends of the tubing (12) are connected to a motorized four-way valve (15).

The tubing (12) having two vertical modules (13) and (14) can be doubled so as to produce the effect of one tubing having a heat transfer fluid conveying calories and the other tubing having a heat transfer fluid conveying frigories, the free ends of the tubings (12) being connected to a four-way double valve.

The air inlet openings (31), which are equipped with filters (10), are made on a wall of the frame (3) which is located at a distance from the bottom of the radiator, thus from the wall on which it is posed, enabling the passage of an suction head (7), having appropriate shape and dimensions, provided with a longitudinal slot (71), directly connectable to the hose (72) of a home vacuum cleaner.

The radiator comprises:
opposing each exchanger module (13) and (14), sides (36) for recuperation of condensates that flow into a tray (37);
at the top of the tubing a means of bleeding (21);
insulating material (8) which is installed for mixed apparatus and for cooling only apparatus but not for heating only apparatus.

It also comprises a manual or automatic means of electronic regulation of the temperature, simple to access and use, acting, depending on the temperature difference between the ambient air and the set point:
on the fan speeds with the possibility of preventing any ventilation in heating mode if the temperature of the blown air is equal to or less than ambient temperature;

on the four-way motorized valve(s).
a means of remote control of one or multiple radiators by transmission via power line.

It can also comprise a booster electrical heater band (not shown) located in the volume of ventilated air or in the front plate (4).

Of course, the person of skill in the art will be able to make the invention as described and shown by applying and adapting known methods without the need to describe them or shown them.

He can also foresee other variations without departing from the scope of the invention which is determined by the content of the claims.

The invention claimed is:

1. A heat transfer AR apparatus comprising:
   a frame;
   a heat exchanger the heat exchanger including a body with tubing and fins traversed by a heat transfer fluid, the heat exchanger including a first module and a second module;
   a plurality of helical fans downstream from the heat exchanger, supplied with direct current, the plurality of helical fans having axes of rotation passing between the first and second modules; and
   a plate for storing heat, downstream from the plurality of helical fans, each of the axes of rotation passing through the plate,
   wherein the plate and frame together define an air outlet configured to expel air from the heat transfer apparatus in a direction parallel to the rotation axes, and define an air passage parallel to the plate from the helical fans to the air outlet, and
   wherein the heat transfer apparatus defines an air inlet configured to draw air in a direction traverse to the rotation axes.

2. The heat transfer apparatus according to claim 1 wherein the plate is made of glass.

3. The heat transfer apparatus according to claim 1 wherein the fans traverse a silicone sheet.

4. The heat transfer apparatus according to claim 1 wherein the tubing constitutes a fluid circuit between the first module and the second module.

5. The heat transfer apparatus according to claim 4 further including a motorized four-way valve, wherein the tubing defines an end connected to the motorized four-way valve, and another end connected to the motorized four-way valve.

6. The heat transfer apparatus according to claim 4 further including a motorized four-way valve, wherein the tubing defines an end connected to the motorized four-way valve;
another end connected to the motorized four-way valve;
a first section in the first module, the first section defining a first longitudinal axis; and
a second section in the first module, the second section defining a longitudinal axis removed from the first longitudinal axis.

7. The heat transfer apparatus according to claim 6 wherein the tubing defines
   a third section, the third section being in the second module, the third section defining a third-section longitudinal axis; and
   a fourth section, the fourth section being in the second module, the fourth section defining a longitudinal axis removed from the third-section longitudinal axis.

8. The heat transfer apparatus according to claim 1 wherein the heat transfer apparatus is positioned against a wall, and the heat transfer apparatus further includes
   a suction head, between the wall and the air inlet; and
   a hose of a home vacuum cleaner connected to the suction head.

9. The heat transfer apparatus according to claim 1 further including
   a tray; and
   a side above the tray and opposing the second module, the side being configured to collect condensate.

10. The heat transfer apparatus according to claim 1 wherein the plate defines a plane of symmetry, and the plurality of fans are on the plane of symmetry.

11. The heat transfer apparatus according to claim 10 wherein the plurality of fans includes six fans.

12. The heat transfer apparatus according to claim 1 wherein the heat transfer apparatus is positioned against a wall.

13. The heat transfer apparatus according to claim 1 wherein the heat transfer apparatus is positioned against a wall, the plate defines a vertical plane of symmetry, and the plurality of fans are on the vertical plane of symmetry.

14. The heat transfer apparatus according to claim 13 wherein the plurality of fans includes six fans.

15. The heat transfer apparatus according to claim 1 wherein the plate is made of metal.

16. The heat transfer apparatus according to claim 1 wherein the plate is made of a material selected from a group consisting of a mineral, metal, or glass.

* * * * *